July 14, 1953  H. V. SCHWEITZER  2,645,200
DISHWARE LINING MACHINE
Filed Jan. 30, 1950  9 Sheets-Sheet 1

INVENTOR.
HOWARD V. SCHWEITZER
BY Ely & Frye
ATTORNEYS

July 14, 1953 H. V. SCHWEITZER 2,645,200
DISHWARE LINING MACHINE
Filed Jan. 30, 1950 9 Sheets-Sheet 2

INVENTOR.
HOWARD V. SCHWEITZER
BY Ely & Frye
ATTORNEYS

July 14, 1953  H. V. SCHWEITZER  2,645,200
DISHWARE LINING MACHINE
Filed Jan. 30, 1950  9 Sheets-Sheet 6
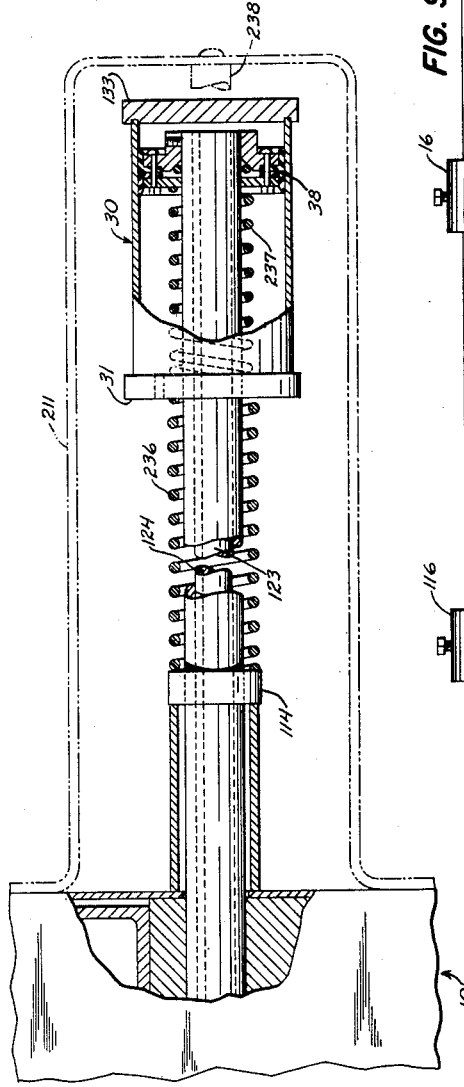
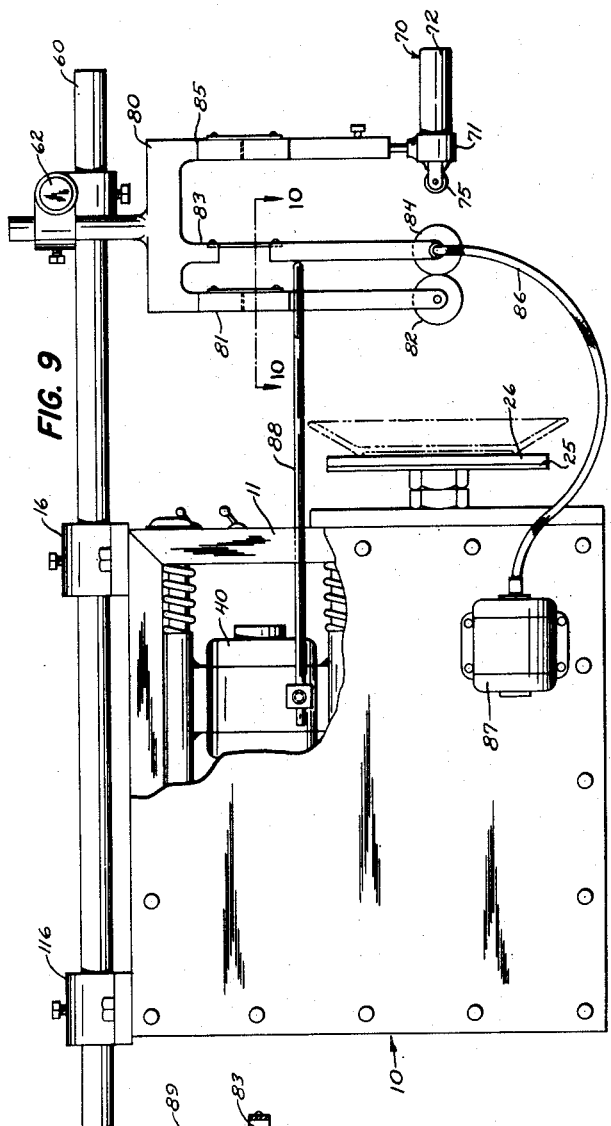
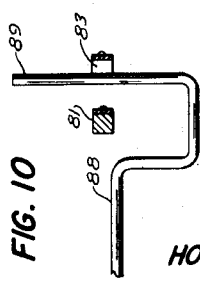
INVENTOR.
HOWARD V. SCHWEITZER
BY
*Ely & Frye*
ATTORNEYS

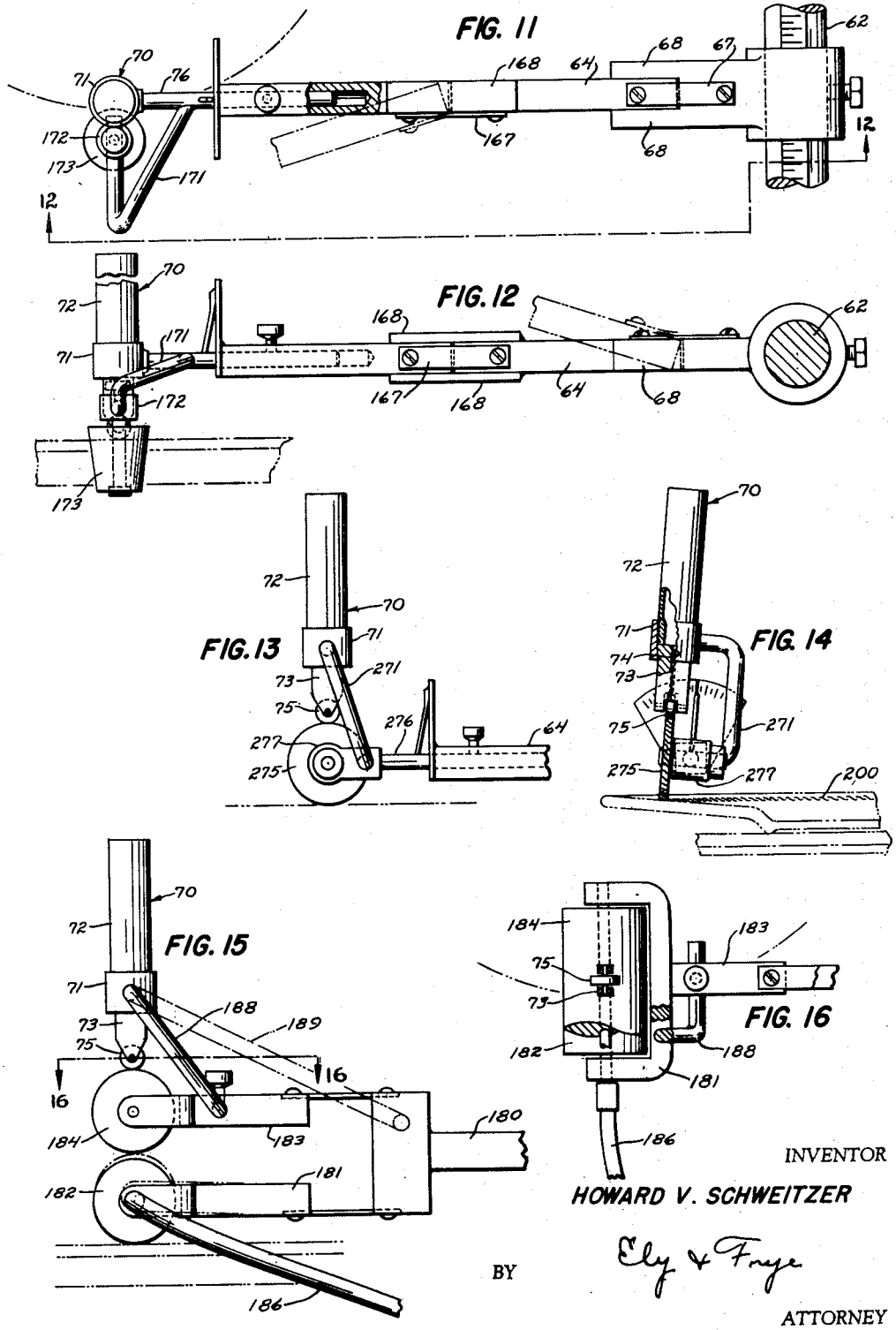

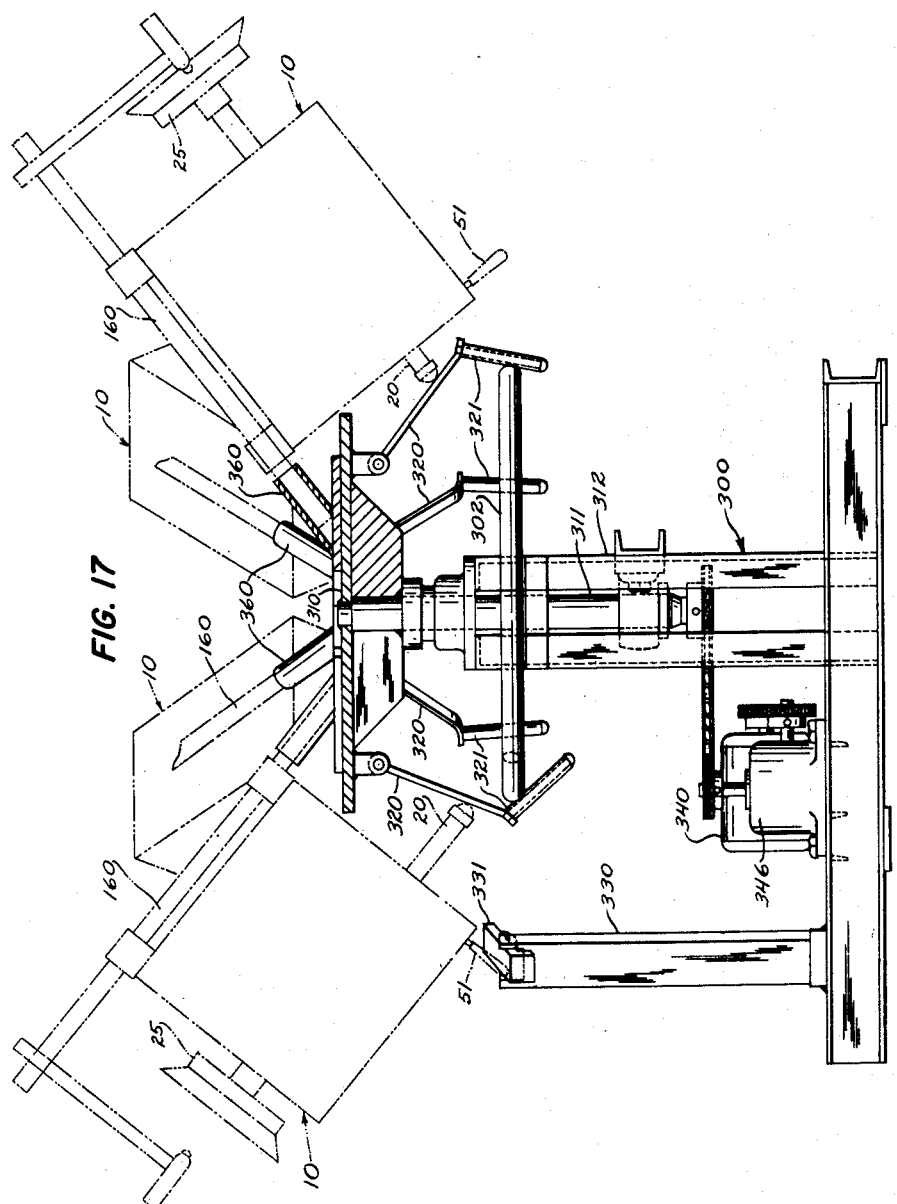

July 14, 1953 H. V. SCHWEITZER 2,645,200
DISHWARE LINING MACHINE
Filed Jan. 30, 1950 9 Sheets-Sheet 9

INVENTOR.
HOWARD V. SCHWEITZER
BY Ely & Frye
ATTORNEYS

Patented July 14, 1953

2,645,200

UNITED STATES PATENT OFFICE 2,645,200

DISHWARE LINING MACHINE

Howard V. Schweitzer, Shaker Heights, Ohio

Application January 30, 1950, Serial No. 141,254

15 Claims. (Cl. 118—211)

This invention relates to improvements in machines for decorating ceramic ware, and, more particularly, to automatic machines for applying decorative lines to dishware which require only unskilled manual labor, if any, in loading and unloading the machines. This application is a continuation-in-part of my copending application for "Dishware Lining Machine," Serial No. 120,443, filed October 10, 1949, now abandoned.

Until recent years, the application of decorative lines of gold or color to the edge of dishware or equidistant therefrom was entirely a manual operation in which the color or gold was applied with a fine brush held in the hand of the decorator. For a number of years, efforts have been made to develop machines which could perform this seemingly simple operation, but even the operative machines which have been developed in recent years have required complex, and consequently expensive, mechanisms to accomplish the desired results. Some machines could only apply lines to the edge of ware and not to the rim inside the edge, and vice versa. All operative machines required a complex timing, chucking, centering, and color or gold feeding mechanisms which frequently went out of adjustment. The expense of such complex machines often not only offset the direct labor savings effected but many dishware plants did not have the skilled supervisory engineers necessary to maintain such prior art machines in adjustment or to reset the machines so that different sizes of ware could be lined or so that different patterns of lines could be applied. Even the largest dishware plants having established mechanical engineering departments frequently relied upon the manufacturers of the prior art machines to furnish representatives to service the machines.

Another deficiency of the prior art machines was that, to realize the advantages of automatic lining machines fully, large multi-spindle machines, capable of lining several pieces of ware simultaneously, had to be employed. Not only were such multi-spindle machines practical only in the relatively few larger potteries having production capacities which warranted their use, but even in these larger potteries, the rated production was seldom achieved. The adjustment or maintenance of the mechanism at any one spindle required that the entire machine be shut down, with the consequent large loss of production due to the "down time" of the machine.

It is the object of this invention to provide a simple lining machine which is extremely simple in construction and accurate in operation; a machine made according to this invention is unlikely to become out of adjustment and is simple to reset for different patterns of decoration and sizes of ware. Instead of requiring a supervisory engineer to set the machine by trial and error methods until the desired pattern is lined, as in the case of prior art machines, the unskilled operator may set up the machine for a given pattern of decoration on a given type of ware by simply adjusting the machine according to dial and gauge settings set forth in written instructions.

It is another object and advantage of this invention to provide a basic lining unit which may be used as a simple lining machine or, when mounted on a suitable turret, may be operated with similar units as a multi-spindle machine having a high production capacity. Machines made according to this invention, therefore, may be provided with efficient capacities for large or small operations. A particular advantage in multi-spindle machines is that any one or more of the lining units may be quickly removed from a turret for resetting, adjustment, or repair so the machine is "down" only from the moment or so that is required to remove and/or replace a unit. Even if a unit is not replaced while it is removed from a turret, the loss in production resulting from the removal of one unit is but a fraction of that which would occur if the entire machine had to be shut down.

Another object and advantage of a machine made according to this invention is that the operations of freeing ware from the centering device, securing the centered ware on the chuck, engaging and disengaging the ware and the lining device, starting and stopping the spindle for loading and unloading, and releasing the ware from the chuck are all accomplished by the simple movement of the spindle shaft with respect to the frame. The complex timing cams and follower mechanisms or linkages of the prior art are eliminated; vacuum pumps and their motors and the like are also eliminated.

Another object and advantage of this invention is that only relatively unskilled labor is required to operate the machine, which produces better lines more accurately and far faster than can be produced by hand. In the multi-spindle machine, the operator needs only to load the ware, unloading and all other operations being fully automatic.

A still further advantage of this machine is that an extremely simple but superior lining device is provided and supported so that perfect lines are insured. Gumming or drying of the color is not a problem nor are the complicated color circulation pumps required, as in most prior art machines. The actual color feed mechanisms are small so that a plurality of lines may be applied simultaneously without interference. Colors may be changed quickly and easily without even disturbing the adjustment of the balance of the machine. The machine may line either the edge of ware or line the rim and verge of flat ware; while shown lining circular ware, it is also suitable for lining fluted ware and non-circular ware.

Other objects and advantages of this invention will be apparent from the following specification, claims, and drawings, in which Fig. 1 is a side elevation of an embodiment of this invention, a lining unit being shown mounted for operation as a single spindle machine.

Fig. 8 is a detailed elevation, partly in section, showing still another modification of a suitable vacuum cylinder.

Fig. 9 is a side elevation of a modified unit suitably mountable on a turret of a multi-spindle machine and also showing an edge lining attachment.

Fig. 10 is a detail taken along the line 10—10 of Fig. 9.

Fig. 11 is a plan view of a modified color feed device and supporting arm for lining ware having a non-circular edge.

Fig. 12 is a side elevation of the mechanism shown in Fig. 11.

Fig. 13 is a side elevation of another modified lining device.

Fig. 14 is a front elevation of the lining device shown in Fig. 13.

Fig. 15 is a side elevation of a modified edge lining device.

Fig. 16 is a plan detail, partly broken away, taken along the line 16—16 of Fig. 15.

Fig. 17 is a side elevation of a turret upon which lining units may be mounted to provide a multi-spindle machine automatically operated.

Figure 2:
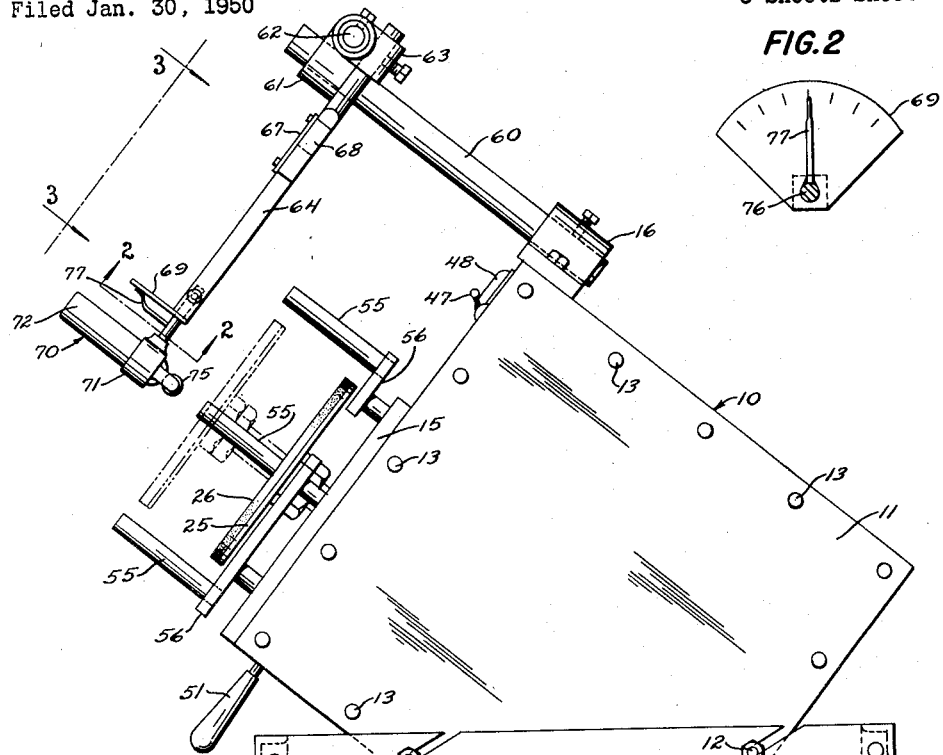
Fig. 2 is an enlarged detail elevation taken along the line 2—2 of Fig. 1.
Figure 1:
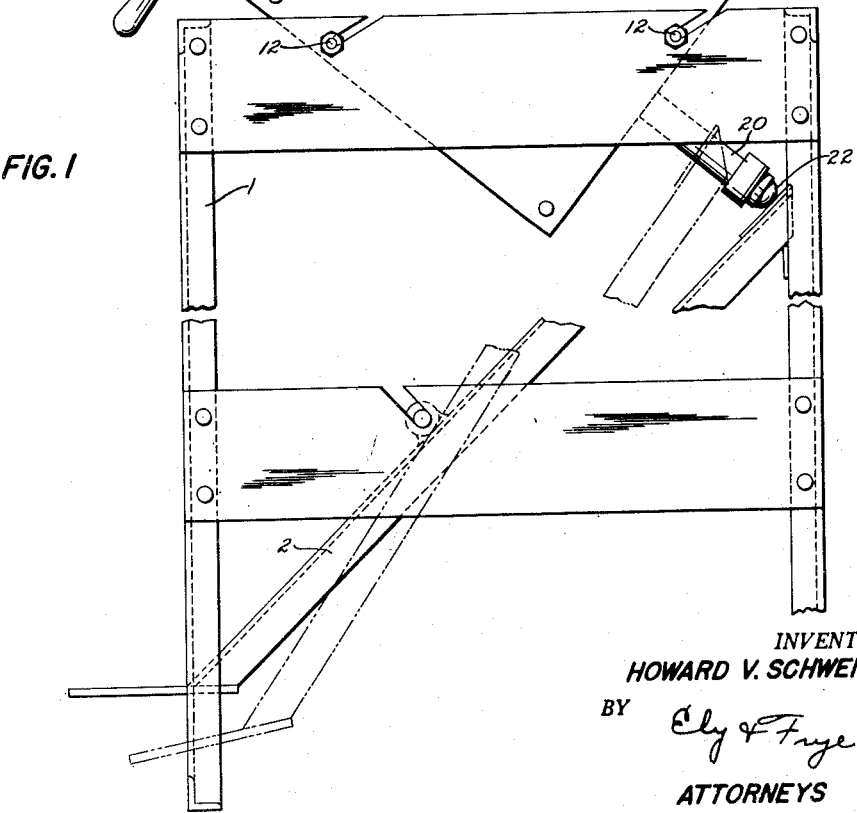

As shown in Fig. 1 of the drawings, a lining unit 10 made according to this invention may be employed as a single-spindle, operator-actuated lining machine by employing frame bolts 12 to mount the unit 10 in a stand 1 carrying a suitable spindle-shifting treadle 2. As shown in Fig. 1, the unit 10 is preferably mounted so that its spindle and chuck are at an acute angle to the horizontal. This position of the chuck, unobtainable with prior art lining devices, facilitates loading and permits automatic unloading. Other suitable supports may be employed, however, the operation of the machine not being limited to any particular angle of the spindle to the horizontal.

Figure 4:
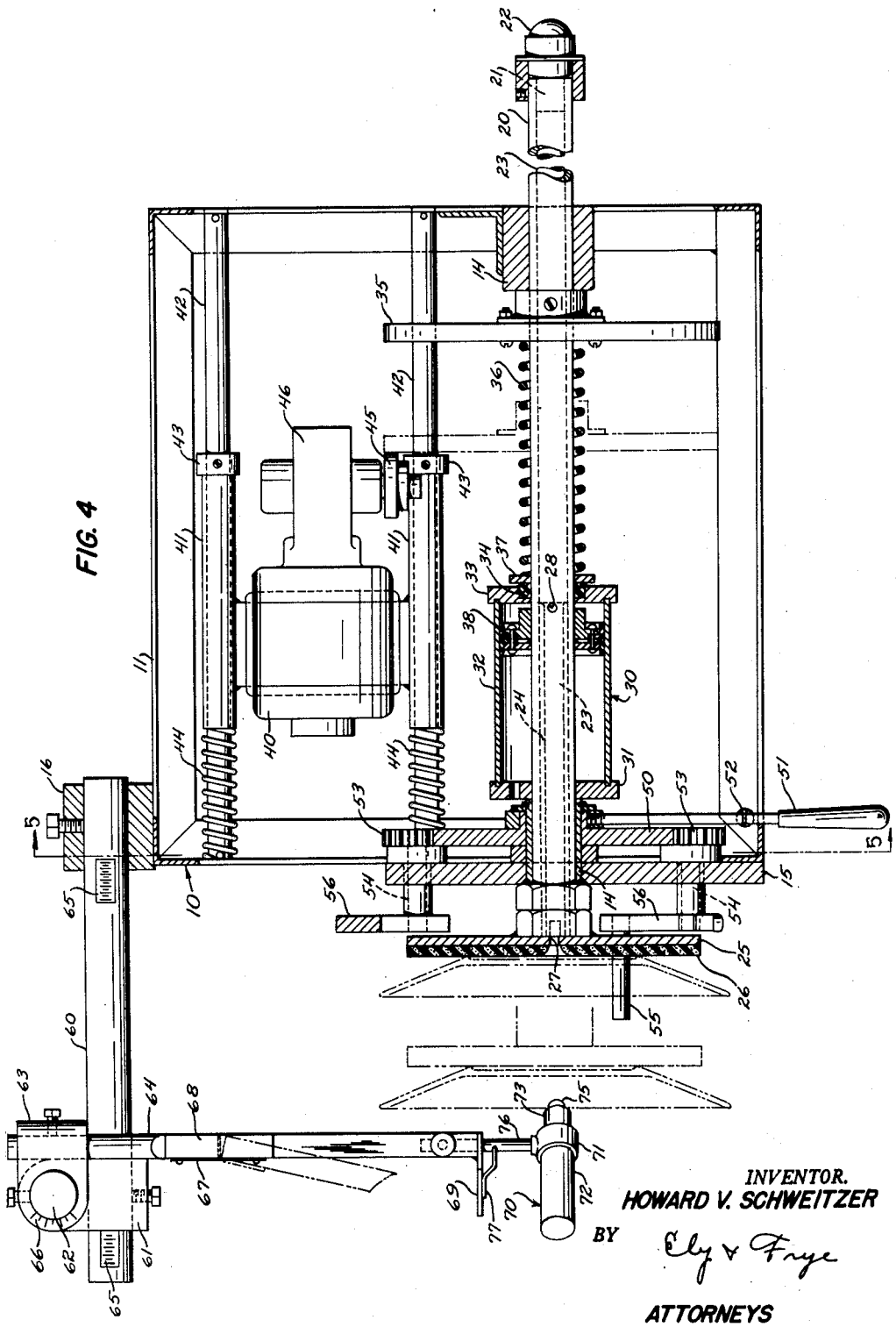
Fig. 4 is a longitudinal cross-section of the unit shown in Fig. 3, being taken along the line 4—4 thereof.
Figure 5:
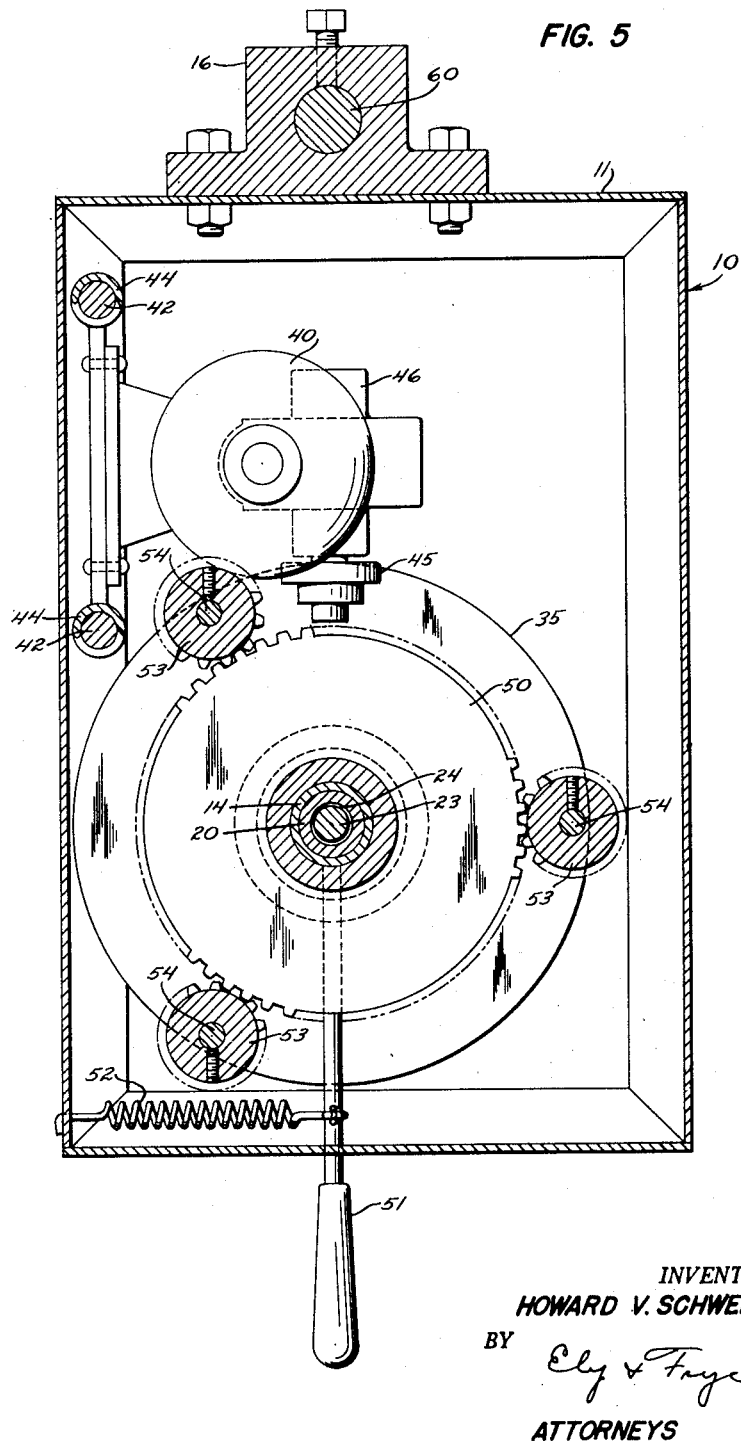
Fig. 5 is a transverse cross-section showing the centering mechanism drive and motor mounting, being taken along the line 5—5 of Fig. 4.

As shown most comprehensively in Fig. 4, the unit 10 comprises a frame 11 to which suitable cover panels are secured by frame bolts 12 and cover screws 13. The frame 10 carries bearings 14 in which is slidably and rotatably mounted the spindle 20. Spindle 20 is preferably a length of hollow tubing sealed at its lower end with a plug 21 and on which lower end is mounted a ball thrust bearing 22 adapted to be engaged by spindle-shifting means such as the treadle 2. At its upper end the spindle 20 carries the demountable chuck 25 having a soft resilient cover 26 of sponge or foam rubber, for example. The chuck 25 and cover 26 are provided with a center port 27 opening into the interior of the spindle 20 to communicate with the vacuum port 28 drilled through a like wall of the spindle 20. To minimize the volume of air in the passageway between the ports 27 and 28, the spindle 20 may carry the interior filler rod 23 preferably having a larger lower end which fills the spindle below the vacuum port 28 and an upper end of a somewhat smaller diameter and terminating just short of the chuck port 27. The space between the smaller upper end of the rod 23 and the inner diameter of the spindle 20 provides a passageway 24 connecting the ports 27 and 28.

Surrounding the spindle 20 just below the upper bearing 14 is a vacuum cylinder 30 comprised of an upper head 31 slidably mounted on the spindle 20 and provided with a suitable port to the atmosphere. The upper head 31 is connected by the cylinder wall 32 to the lower head 33, which is also slidably mounted on the spindle 20 but the joint therebetween is packed with the packing 34. In the embodiment shown, the vacuum cylinder head 31 is always pressed against the upper bearing 14 by means of the spindle spring 36 engaged, usually under at least some compression between the spindle driving gear 35 and the packing washer 37 also serving to compress the packing 34 of the lower cylinder head 33. As shown, the spindle driving gear 35 is a frictional face gear fixed to the spindle 20.

Fixed to the spindle 20 just above the vacuum port 28 is the vacuum piston 38. Since upward movement of the cylinder 30 is resisted in the embodiment of Fig. 4 by the upper bearing 14, upward movement of the spindle 20 will create a vacuum between the piston 38 and lower head 33, which vacuum is communicated to the chuck port 27 by the port 28 and passageway 24. Contrary to what would be expected, in view of the large capacity of the separately driven vacuum pumps required in prior art machines, the vacuum created in the cylinder 24 is more than adequate to hold even large platters securely on the chuck 25. The elimination of vacuum losses through rotary fittings, long vacuum lines, and the like is probably the principal factor contributing to the effectiveness of the vacuum cylinder 30.

The normally constantly running motor 40 for driving the spindle 20 is mounted on tubular slides 41 carried by the way rods 42, which are parallel to the spindle 20. The slides are urged against the stop collars 43, preferably by the compression springs 44. The motor 40 is provided with a gear head 46 which carries a friction pinion 45 mounted on a shaft perpendicular to the spindle 20. The stop collars maintain the pinion 45 out of engagement with the gear 35 when the spindle is in the normal retracted position shown in Fig. 4.

Figure 3:
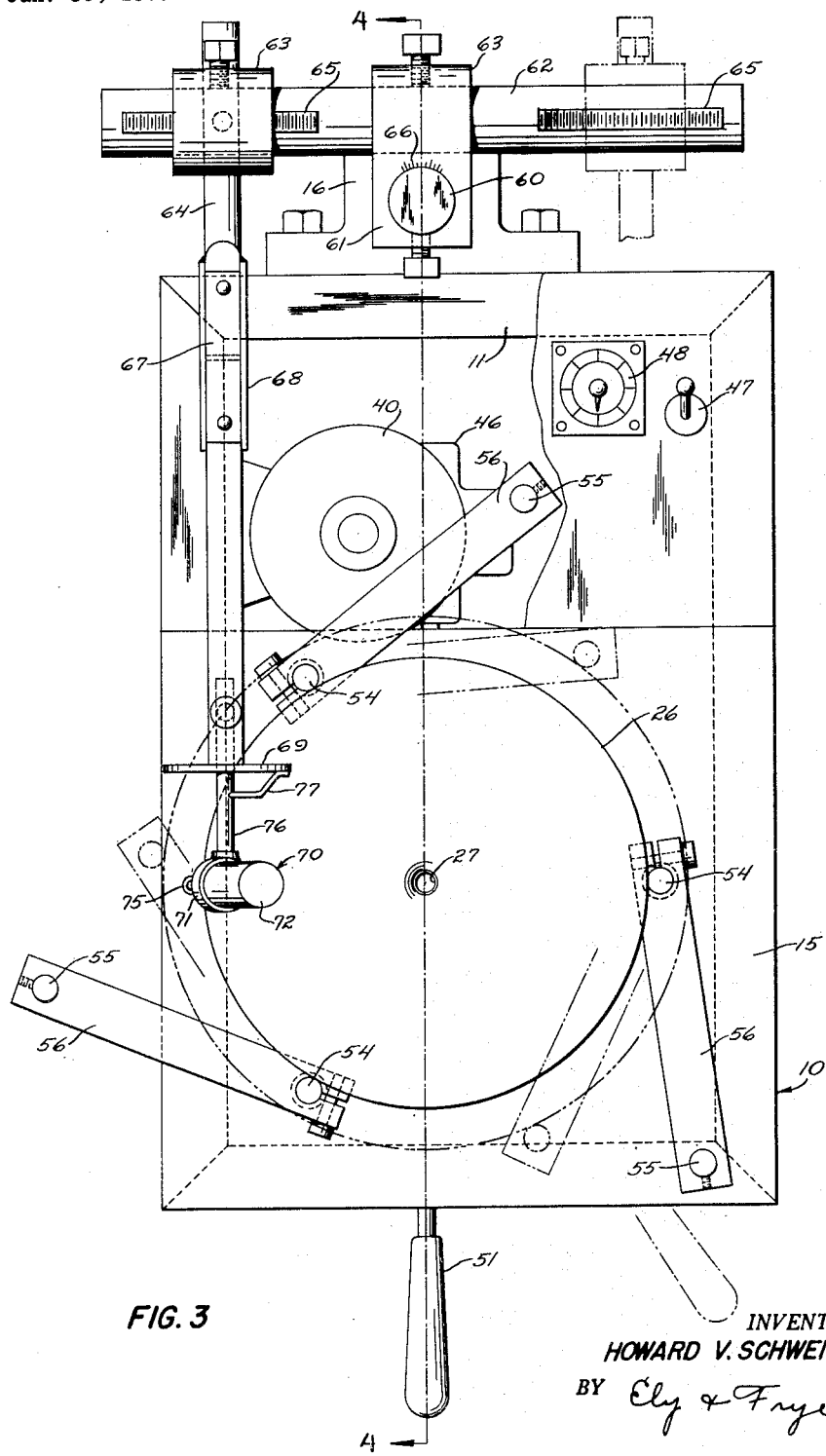
Fig. 3 is a front elevation of the unit shown in Fig. 1 and taken from the plane of line 3—3 in Fig. 1, the cover of the unit being broken away to show the location of the main motor for the unit.

The centering device for mounting circular plates and the like on the chuck 25 comprises a large centering gear 50 rotatably mounted on the upper bearing 14 and provided with a handle 51 which extends through a slot in one of the cover panels for the frame 11. The centering gear 50 engages three planetary pinions 53 mounted on shafts 54 journaled in and extending through the centering plate 15 carried by the frame 10. The outer ends of the shafts 54 are provided with arms 56, on the ends of which are mounted the upstanding centering pins 55. With the handle 51 normally swinging to its farthest clockwise position by the spring 52 as shown in Figs. 3 and 4, the centering pins 55 are in their position of maximum opening. When the handle 51 is swinging counter-clockwise, however, the centering pins are quickly pivoted toward the center of the chuck 25, thereby centering round ware on the chuck.

It is to be noted that the shafts 54 are journaled in plate 15 so that when the centering pins 55 are normally swinging open and away from ware on the chuck, no pin is in a position to prevent the ware from sliding off the chuck 25.

To support the lining device or devices on the unit 10, a pillow block 16 is secured to the frame 11 of the unit 10 to support a lining staff 60 parallel to the spindle 20, the staff 60 being longitudinally adjustable in the pillow block. The staff 60 carries an adjustably mounted block 61 in which a cross-staff 62 is adjustably mounted. On the cross-staff 62 one or more arm blocks 63 are adjustably mounted (one being shown). As indicated, each staff is provided with suitable inset scales 65 and the blocks are provided with dials 66 so that relative positions of the staffs and blocks may be set according to predetermined settings. A jointed square lining arm 64, likewise provided with a suitable scale, is mounted adjustably in the arm block 63 so that its outer end extends over the locus of ware centered on the chuck 25.

As indicated in the drawings, a suitable joint in the lining arm comprises a spring 67 riveted to the tops of the sections of the arm 64 and normally holding their square cut ends in abutment. Side plates 68 secured to one of the arm sections prevent sidewise misalignment of the arm sections. It has been found that this type of joint permits the arm to be spring jointed from a normal aligned position with a minimum of play. In other instances, however, it may be desirable to provide a pivoted joint with an adjustable spring urging the jointed sections of the arm 64 against suitable stops which, when engaged by an arm section, maintain the arm sections in alignment.

The end of the arm 64 carries a dial 69 and is socketed to receive and adjustably secure the bracket pin 76 of the lining device 70. As indicated in Fig. 14, the lining device 70 comprises a collar 71 having a downwardly tapered bore suitably threaded at its upper end to receive liquid color or gold vial 72. A pair of tapered chucks 73 are locked in the sleeve 71 by threading the vial 72 therein. The pair of chucks 73 terminate in a fork in which is journaled a small lining wheel 75 which closely fits the base of the fork provided by the chucks 73. A bore 74 in the chucks 73 allows color or gold from the vial 72 to be picked up on the rim of the wheel 75 and carried as a thin film thereon, the vacuum in the vial 72 preventing the liquid therein from flooding the wheel 75. Millings on the rim of the wheel seem to aid in allowing small volumes of air to be fed into the vial to replace the liquid transferred from the rim of the wheel to the ware. Because the wheel permits the feed of only the film of liquid on the rim thereof, the width of the rim of the wheel determines the width of the line inscribed on the ware. The collar 72 carries the bracket pin 76, which extends perpendicularly to the vial 72 and the shaft of the wheel 75. The perpendicular pointer 77 on the bracket pin 76, therefore, indicates on the dial 69 the angle at which the lining wheel 75 is set.

To line a plate or like piece of flatware with the unit shown in Figs. 1 to 5, the lining device 70 is mounted and positioned by the supports provided by the structure of elements 60 to 69, the several elements being set by the operator according to prescribed settings for the dish in question. The wheel 75 is also selected for the width of line desired. The motor 40 is then switched on by means of the motor switch 47 and the speed is adjusted according to the prescribed setting for the motor rheostat 48 (see Fig. 3).

With the unit set for operation, a plate is placed on the chuck 25 and the handle 51 is swung counter-clockwise to center the ware on the chuck. While holding the handle 51, the spindle 20 is shifted from its normal retracted position by the treadle 2 or such other shifting means as may be employed. As the plate is lifted in the centering pins 55, vacuum created in the cylinder 30 holds the plate in its centered position. Continued shifting of the spindle 20 lifts the plate above the centering pins, at which time the handle 51 may be released. As the plate is lifted above the pins 55, the spindle gear 35 engages the friction pinion 45, causing the spindle to turn. As the spindle approaches its maximum position of advance, the motor 40 is retracted on the ways 42 and the lining wheel 75 engages the rotating plate and is, in turn, rotated to feed color or gold and scribe the desired line on the plate. Because nearly all ware is at least slightly warped, the jointed arm 64 permits the wheel to follow the contour of the plate, which may even be fluted. In a second or less the plate is lined and the operator releases the spindle shifting means, such as the treadle 2. The spring 36 retracts the spindle 20. As the spindle approaches its retracted position, the vacuum in the cylinder falls off and the lined plate, being released from the chuck 25, slides off the chuck and past the open centering pins to automatically unload itself into the hands of the operator or, preferably, onto a moving conveyor belt.

As evident from the foregoing, even an unskilled operator can quickly reset the unit for a different pattern or different size of ware. To change color or width of the line, one lining device 70 is simply removed from the socket in the arm 64 and replaced by another having the desired color and/or wheel width.

Figure 6:
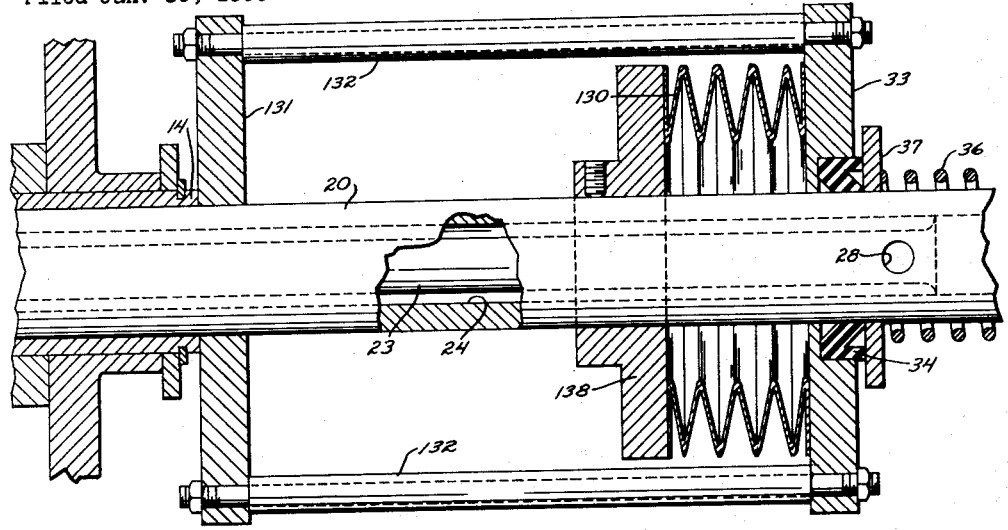
Fig. 6 is a detailed elevation, partly in section, of a modified vacuum cylinder as shown in Fig. 4.

In several respects the location of the vacuum-creating means about the spindle 20 is one of the more outstanding features of this invention, and many variants may be employed to create a vacuum for the chuck 25 by the axial shifting of the spindle 20. As shown in Fig. 6, one modification may be a Sylphon tube or bellows 130 and collar 138 to replace the cylinder 30 and piston 38, the cylinder wall 32 being replaced by the spacer rods 132 carried by the plate 131. Grit and dust which is nearly always present in the atmosphere of a pottery will not wear the Sylphon tube 130 as it may wear a piston 38. This modification shown in Fig. 6 also employs a variant which may be employed in any of the modifications shown in Figs. 4, 6, and 7. It is to be noted that, in the embodiment shown in Fig. 6, the port 28 is located on the spindle 20 so that, in the spindle's retracted position, the port 28 will be just outside the head 33 and the passageway 24 to the chuck port 27 will be open to the atmosphere. This variant ensures that the vacuum on the chuck 25 will be broken when the spindle 20 returns to its retracted position.

Figure 7:
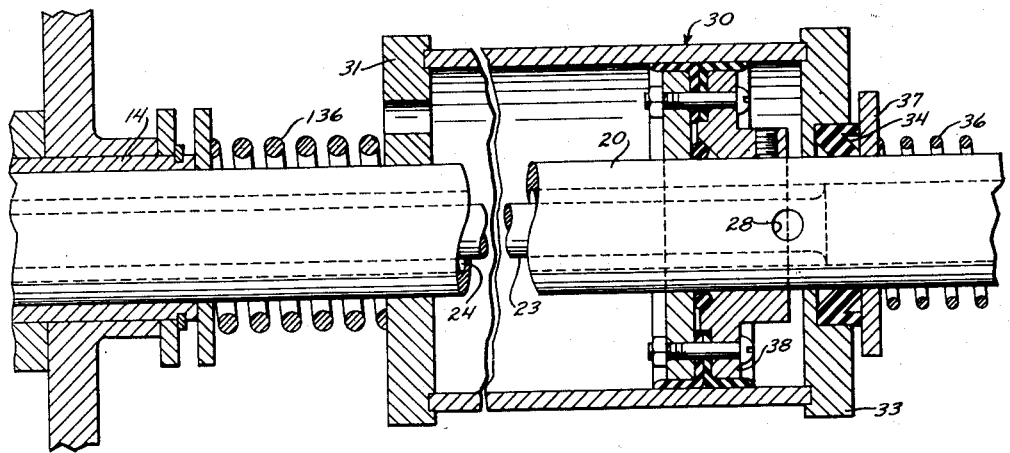
Fig. 7 is a detailed elevation, partly in section, showing another modification of a suitable vacuum cylinder.

Still another modification, as shown in Fig. 7, is recommended where it is desirable to cushion the application of vacuum to the ware in the chuck and thereby avoid such loads on the shifting mechanism by the sudden application of extremely high vacuums that the shifting of the spindle might be slowed down. Such cushioning is also desirable in the lining of relatively fragile ware, where the sudden application of excessively high vacuums might cause breakage. In this modification a cushioning spring 136 is interposed between the cylinder head 31 and the end of the upper bearing 14. As vacuum is created by shifting the spindle 20, the entire cylinder 30 will tend to move with the spindle 20 against the resistance of the spring 136, the strength of the spring 136 regulating the vacuum applied as well as cushioning a sudden application of vacuum. A particular advantage of this modification is that, if a leak should arise (at the chuck due to badly warped ware or a worn cover 26, or due to wear of the piston 38 or the packing 34), the compression of the spring 136 will move the cylinder 30 backward while the spindle is held in its advanced position, thereby maintaining an effective vacuum during the relatively short time required for actually lining the ware. With this modification, even noticeably fast leaks may exist in the vacuum system without interfering with the operation of the chuck.

As shown in Fig. 8, to eliminate the packing 34, the port 28 may be eliminated and the cylinder 30 moved to the end of the spindle 20, the bearing 22, plug 21, and rod 23 being removed, and the rod 23 preferably being replaced by a rod 123 having a groove 124 cut in its surface. The lower cylinder head 33 is also replaced by a solid head 133 and the spindle 20 is advanced by any suitable means, such as a fork (not shown) which bears against the rear face of the friction gear 35. In this modification a spindle spring 236 is interposed between the cylinder 30 and a sleeve-supported collar 114. An internal cushioning spring 237, weaker than the spring 236, is also interposed between the head 31 and the piston 38. Advancement of the spindle 20 will tend to carry the cylinder 30 along with it until the cylinder's movement is resisted by the spring 236, whereupon a vacuum, transmitted to the chuck by the passage 124, will be created between the piston 38 and head 133. If the vacuum should fall during the lining operation, the spring 236 will move the cylinder 30 rearwardly to maintain the vacuum, as in the modification shown in Fig. 7.

The function of the weaker spring 237 is to insure that the head 31 and piston 38 will be spaced when the spindle 20 is in its retracted position.

A still simpler means of eliminating the packing 34 is also indicated in Fig. 8. With the end of the spindle 20 open and the port 28 and cylinder 30 eliminated, a fixed piston rod 238, supported by a cover 211, is mounted in the spindle 20. Advancement of the spindle 20 against a suitable compression spring will create a vacuum ahead of the end of the piston rod 238.

Various modifications may be made in the lining mechanisms to meet special conditions. For example, in scribing concentric circular lines close to the edge of badly warped or out-of-round ware, the optical illusion that the line is out of round or eccentric may arise. To overcome this illusion or to scribe a line very close to the edge of ware, the lining device 70, as shown in Figs. 11 and 12, may be provided with an edge-follower bracket arm 171 attached to the bracket pin 76, the arm 171 being shaped to provide a radially extending portion adjacent the collar 71. On the radial portion of the arm 171 a block 172 is adjustably mounted, the block 172 carrying a downwardly depending conical roller 173 which engages the edge of the ware and maintains the wheel 75 equidistant therefrom. To employ this edge-following lining device, the arm 64 must be provided with a second joint comprised of a spring 167 and side plates 168 to permit the arm to hinge in two perpendicular planes. Such edge following lining devices also permit non-circular ware, such as oval platters and square plates, to be lined.

To avoid wear on the lining wheel 75 of the lining unit 70, such as may arise in lining bisque ware, or to provide a patterned line, a modification as shown in Figs. 13 and 14 may be employed. In this modification the arm 64 receives a pin 276 terminating in a bearing 277 in which is journaled the axle of a transfer wheel 275. The pin 276 also carries a bracket arm 271 on which is mounted a lining 70 so that its lining wheel 75 contacts the transfer wheel 275. If this modification is employed simply to reduce wear, the ware-engaging surface of the wheel 275 is relatively smooth and made of a more wear-resistant material than the lining wheel 75. If this modification is employed for the purpose of providing a patterned line, the surface of the wheel is provded with a patterned surface, as shown in Fig. 14, to print a patterned line 200. By timing the shifting of the spindle 20 so that the transfer wheel 275 is in contact with the ware for one revolution of the chuck, any lack of register between the start and the end of the patterned line is no greater than that previously obtained with tissue transfers or decalcomanias.

To line the edge of ware, it is usually preferable to employ a lining roll which, in lining position, extends substantially radially of the ware. The surface of the lining roll is usually rubber or like resilient material and is usually smooth in order to inscribe a solid line. Sponge rubber, however, may be employed to decorate the ware with a stippled edge and a patterned surface may be employed to print a patterned line.

One embodiment of a suitable edge-lining mechanism is shown in Fig. 9, in which a fork 80 is carried by the cross-staff 62. The fork 80 is provided with a jointed tine 81 carrying the lining roll 82, a spring tine 83 carrying the power-driven transfer roll 84, and a jointed tine 85 carrying a lining unit 70. The transfer roll 84 is preferably driven constantly through a flexible shaft 86 by a small motor 87 mounted on the side of a unit 10. The rolls 82 and 84 are normally in contact, the lining roll 82 being driven by the transfer roll 84 to spread the color or gold on the rolls into uniform films on the rolls. As the chuck 25 moves the edge of the rotating ware thereon into contact with the lining roll to form an edge line, however, a rod 88, having a hook end 89 (see Fig. 10) and mounted to move with the motor 40, lifts the transfer roll 84 away from the lining roll 82 and into contact with the wheel 75 of the lining unit 70. While the lining roll 82 is floating in contact with the ware edge and is driven thereby and thus losing color to the edge of the ware, the driven transfer roll 84 is in contact with the wheel 75 and picking up color therefrom during substantially the same period of time. When the chuck 25 returns to the ware-unloading position, the transfer roll 84 returns to contact with the lining roll 82, replenishing gold or color lined on the ware.

Another embodiment of a suitable edge lining device is shown in Figs. 15 and 16, in which a fork 180 is provided with a spring tine 181 carrying a lining roll 182 and a spring tine 183 carrying a transfer roll 184 normally spaced from the lining roll 182 but engaging the wheel 75 of a lining unit 70 mounted on the tine 183 by means of the bracket arm 188. In this embodiment the lining roll 182 is constantly driven through the flexible shaft 186 by means of a variable speed motor (not shown) adjusted so that the peripheral speed of the lining roll 182 is substantially equal to the peripheral speed of the edge of the ware to be lined. In this embodiment, raising of the ware to contact the lining roll is continued until the lining roll also contacts the transfer roll 184. During the lining operation, the transfer roll 184 is driven by the lining roll 182, taking gold or color from the lining unit wheel 75 and transferring it in an even film on the lining roll 182. As indicated in Fig. 15, the lining unit shown therein may be further modified by supporting the unit 70 directly from the fork 180 by means of a long bracket arm 189, instead of from the tine 183 by means of the bracket arm 188. In this further modification, it is preferable to have the rolls 182 and 184 in constant running contact with the wheel of the unit 75 normally spaced from the transfer roll 184 except when the roll 184 is raised into contact with the wheel 75 by engagement of the roll 182 on the edge of ware being lined.

In all of the foregoing lining attachments it is to be noted that the reservoir of gold or color is effectively sealed at all times and that gold or color is, directly or indirectly, fed therefrom during intermittent periods corresponding in frequency to the lining of pieces of ware. Further, it should be apparent that, the clearances in the lining unit being fixed, the amount of gold or color fed from the lining units 70 may be effectively controlled by selecting a lining wheel 75 having the desired axial width.

Figure 18:
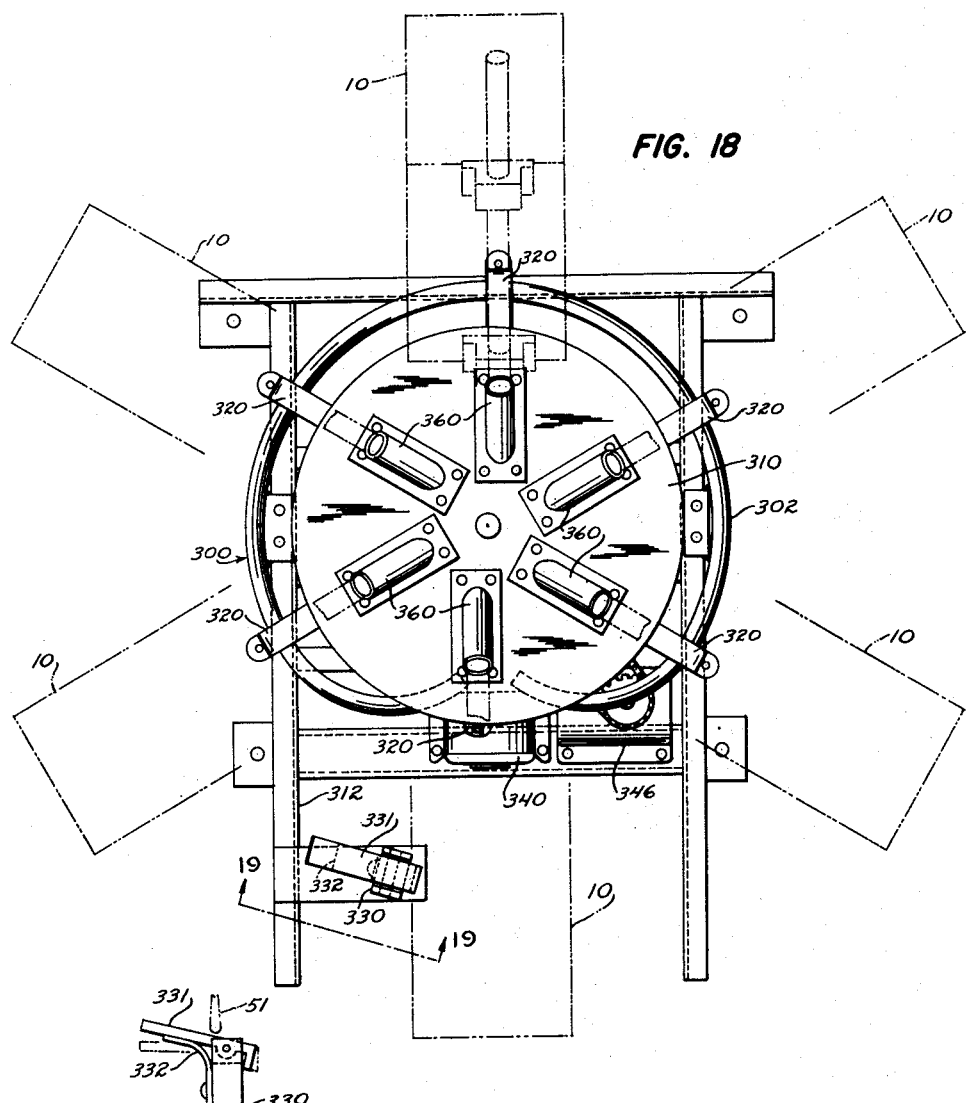
Fig. 18 is a plan of the turret shown in Fig. 17.
Figure 19:
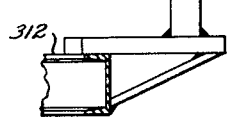
Fig. 19 is a detail elevation of the centering handle operating cam taken from the plane of the line 19—19 in Fig. 18.

To employ a unit 10 in a multi-spindle machine, an elongated staff 160 is employed and is mounted in an additional pillow block 116, as shown in Fig. 9. A turret 300 is provided with a rotating top 310 carrying a plurality of staff sockets 360 adapted to receive the staff 160 and support the units 10 radially outwardly of the top, as shown in Figs. 17 and 18. The turret top 310 is rotated by a shaft 311 mounted vertically in a frame 312, the shaft 311 being driven continuously in this embodiment by a motor 340 through a speed-reducer 346. Pivoted from the turret top 310 are a plurality of spindle shifting levers 320 radially aligned with and corresponding to the staff sockets 360. Each of the spindle shifting levers 320 is provided with an elongated roller cam follower 321 which engages an approximately heart-shaped, fixed cam bar 302 carried by the frame 312. As the units 10 are carried by the turret 300, the cam-activated shifting levers 320 raise and lower the spindles 20 at the re-entrant portion of the cam bar 302 and maintain the spindles 20 in an advanced or shifted position while the units are rotated from the loading and unloading stations adjacent the re-entrant portion of the cam bar 302.

To actuate the centering mechanisms as the spindles 20 are being raised, a post 330 located at the loading station carries a pivoted, spring-pressed handle-tripping dog 331 normally tilted upwardly by the spring 332. As a unit passes the post 330, therefore, an operator simply places a piece of ware on a chuck 25 and holds it there as a handle 51 passes over the dog 331. The dog 331 turns the handle 51 counter-clockwise until the centering pins have centered the ware. Further movement of the handle 51 being prevented by the centered ware, the spring 332 permits the dog 331 to be tipped downwardly until the handle 51 has passed over it. By the time the handle 51 has passed over the dog 331, the spindle 20 will have been raised to hold the ware on the chuck, and the ware will have been lifted clear of the centering pins. During the balance of the rotation of a unit, ware will be lined by suitably supported lining devices until the re-entrant portion of the cam bar 302 is approached, where the shifting levers will permit the spindles to retract, break the chuck vacuum, and automatically unload the ware.

As should be evident, to remove a unit 10 from the turret 300, all that need be done is to stop the turret long enough to permit the power line (not shown) for the motor of the unit to be disconnected from the power source on the turret (not shown) and to permit the unit to be lifted out of the staff holder. The turret may then continue to operate while the removed unit is adjusted or reset.

It is apparent from the foregoing that this invention is not limited to the embodiments disclosed but may be varied within the scope of the following claims.

What is claimed is:

1. A multi-spindle lining machine comprising a turret; a motor to drive said turret; a fixed spindle-shifting cam extending around the axis of said turret, said cam having a spindle advancing portion adjacent a loading station at the periphery of said turret, a spindle retracting portion adjacent an unloading station at the periphery of said turret and a dwell between said spindle advancing and retracting portion; a plurality of lining units removably mounted on said turret, each lining unit comprising a frame, a spindle journalled in said frame for axial and rotational movement and extending outwardly from the axis of said turret, a chuck carried on the outer end of said spindle, a motor to drive said spindle, means to interrupt the driving of said spindle by said motor when said spindle is retracted and to resume said driving when said spindle is advanced, a piston on said spindle, a relatively fixed cylinder in which said piston is moved by said spindle, and a passageway in said spindle and connecting the space between said piston and said cylinder to said chuck; a cam follower to engage said cam and shift said spindle as said spindles are carried by said turret, whereby ware placed on each chuck at said unloading station will be held thereon by vacuum and each spindle will commence to rotate as it is advanced at said loading station and whereby each chuck will release ware thereon and each spindle will decelerate its rotation at said unloading station.

2. In a multi-spindle lining machine as defined in claim 1 a ware centering device on each unit, each centering device comprising at least three pins parallel to the spindle in the unit, means to actuate said centering device by moving said pins toward said spindle at an equal rate from their normal positions spaced equidistant from said spindle, and a centering cam relatively fixed with respect to said turret to actuate each centering pin actuating means, said centering cam being located adjacent said loading station to center ware on said chuck as it is placed on said chuck.

3. In a lining unit of the class described, a frame, an axially movable spindle journaled in said frame, a lining device comprising a lining wheel and means to feed a film of lining composition onto the surface of said wheel, and an adjustable support to support said lining device so that said device may be set at a predetermined angle to and distance from said frame, means to shift said spindle so that ware on said chuck will be brought in contact with said lining device and lined with lining composition supplied by said wheel, and a resilient joint in said lining device support to permit said device to float on ware brought into contact therewith, said resilient joint comprising abutting square cut ends of elements of said lining device support, first flat sides of said abutting elements away from said spindle being adjoined by a flat spring, second and third flat sides being, respectively, aligned in common planes by flat side plates attached to one of said second and third sides and overlying the other of said second and third sides, respectively.

4. A lining unit as defined in claim 3 including a rotatable ware follower carried by said lining device support in a position to contact and follow the edge of ware as said ware is brought in contact with said device to maintain a fixed distance between the edge of such ware and the line of contact with said lining device.

5. A lining unit as defined in claim 3 including a transfer wheel supported by said lining device support and contacting said lining wheel, whereby said transfer wheel will be interposed between said lining wheel and ware and will transfer lining composition from said lining wheel to ware when ware is brought into contact with said lining device.

6. A lining unit as defined in claim 5 in which the surface of said transfer wheel is patterned in order to print a patterned line on ware.

7. A multi-spindle lining machine comprising a plurality of lining units, each lining unit comprising a frame, a spindle mounted in said frame, means to shift said spindle and frame relatively to each other and axially of said spindle, means cooperating with said spindle to define a volume variable according to the relative axial position of said spindle in said frame, a chuck mounted on said spindle, a passageway connecting said variable volume means with the face of said chuck, whereby, when ware is placed on said chuck while said variable volume means normally defines a minimum volume, shifting of said spindle creates a vacuum to hold said ware on said chuck, ware centering pins normally extending beyond said chuck in a direction parallel to said spindle and means to move said pins radially toward and away from said spindle and normally maintaining said pins radially away from said spindle; a turret, means for rotating said turret, means to removably mount said lining units on said turret so that said spindles are located radially thereof, means to shift each spindle fully during a rotation of said turret, and means to actuate means for moving said centering pins at the beginning of each full shift of the spindle associated therewith.

8. In a lining unit of the class described, a frame, an axially movable spindle journaled in said frame, a lining device comprising a lining wheel and means to feed a film of lining composition onto the surface of said wheel, and an adjustable support to support said lining device so that said device may be set at a predetermined angle to and distance from said frame, means to shift said spindle so that ware on said chuck will be brought in contact with said lining device and lined with lining composition supplied by said wheel, and a resilient joint in said lining device support to permit said device to float on ware brought into contact therewith, a transfer roll carried by said support for said lining device, a lining roll carried by said support, and a resilient connection supporting at least one of the combination of said lining wheel, transfer roll, and lining roll in a normally spaced relation from the other two, and means for continuously driving one of said rolls.

9. A lining unit as defined in claim 8 in which the surface of said lining roll is patterned in order to print a patterned line on ware.

10. In a lining unit for dishware, a frame, a spindle mounted in said frame, means to shift said spindle and frame relatively to each other and axially of said spindle, means cooperating with said spindle to define a volume variable according to the relative axial position of said spindle in said frame; a chuck mounted on said spindle, a free passageway connecting said variable volume means with the face of said chuck, whereby, when ware is placed on said chuck while said variable volume means normally defines a minimum volume, shifting of said spindle creates a vacuum to hold said ware on said chuck, a gear on said spindle, a pinion, biased mounting means for said pinion permitting the pinion to move parallel to said spindle for driving said pinion, said pinion being spaced relative to said gear to be disengaged therefrom when said variable volume means is at a minimum volume and to engage said gear when the volume is increased.

11. In a lining unit for dishware, a frame, a spindle mounted in said frame, means to shift said spindle and frame relatively to each other and axially of said spindle, means cooperating with said spindle to define a volume variable according to the relative axial position of said spindle in said frame, a chuck mounted on said spindle, a free passageway connecting said variable volume means with the face of said chuck, whereby, when ware is placed on said chuck while said variable volume means normally defines a minimum volume shifting of said spindle creates a vacuum to hold said ware on said chuck, a lining device comprised of a vial for containing liquid to be lined on ware, a collar receiving the open end of said vial, jaws received in said collar and defining a fork, and a lining wheel rotatably mounted in said fork and fitting closely to the base thereof, said jaws having a bore providing a passageway from said vial to the rim of said wheel, adjustable means for resiliently supporting said lining device at fixed minimum distances from said frame to engage ware carried by said chuck, and scales on said supporting means to permit adjustment of said lining device at a predetermined minimum distance from an angle to said frame.

12. In a lining unit for dishware, a frame, a spindle mounted in said frame, means to shift said spindle and frame relatively to each other and axially of said spindle, means cooperating with said spindle to define a volume variable according to the relative axial position of said spindle in said frame, a chuck mounted on said spindle, a free passageway connecting said variable volume means with the face of said chuck, whereby, when ware is placed on said chuck while said variable volume means normally defines a minimum volume, shifting of said spindle creates a vacuum to hold said ware on said chuck, a staff extending parallel to said spindle and means to adjustably secure said staff to said frame.

13. A multi-spindle lining machine comprising a plurality of lining units, each unit including a frame, a spindle mounted in said frame, means to shift said spindle and frame relatively to each other and axially of said spindle, means cooperating with said spindle to define a volume variable according to the relative axial position of said spindle in said frame, a chuck mounted on said spindle, a free passageway connecting said variable volume means with the face of said chuck, whereby, when ware is placed on said chuck while said variable volume means normally defines a minimum volume, shifting of said spindle creates a vacuum to hold said ware on said chuck, a turret, means for rotating said turret, means to removably mount each of said lining units on said turret so that said spindles are located radially thereof, and cam means to shift each spindle fully at least once during a rotation of said turret.

14. In a lining unit of the class described, a ware chuck, a hollow spindle therefor, means to rotate said spindle, means to shift said spindle axially from a retracted to advanced position, a piston mounted on said spindle, a relatively axially fixed cylinder in which said piston and spindle may move axially, said spindle having a part freely connecting the space between said piston and said cylinder to the interior of said spindle and said chuck having an opening from the face thereof to the interior of said spindle, whereby, when ware is placed in a relatively air tight relationship on the face of said chuck, ware will be held on said chuck as said spindle is advanced by the vacuum created between said piston and cylinder, a frame and a resilient connection between said frame and said relatively fixed cylinder, whereby movement of said piston and spindle in said cylinder will permit some axial movement of cylinder against the biasing effect of said resilient connection and, in the event of leak in said vacuum, the biasing effect of said connection will move said cylinder contra to the advancement of said piston to minimize the loss of vacuum in said cylinder while said spindle is advanced.

15. In a lining unit of the class described, a ware chuck, a hollow spindle therefor, means to rotate said spindle, means to shift said spindle axially from a retracted to advanced position, a piston mounted on said spindle, a relatively axially position, a piston mounted on said spindle, a relatively axially fixed cylinder in which said piston and spindle may move axially, said spindle having a part freely connecting the space between said piston and said cylinder to the interior of said spindle and said chuck having an opening from the face thereof to the interior of said spindle, whereby, when ware is placed in a relatively air tight relationship on the face of said chuck, ware will be held on said chuck as said spindle is advanced by the vacuum created between said piston and cylinder, said piston being located on the end of said spindle and a spring connecting said piston and said cylinder to urge said piston toward a closed end of said cylinder.

HOWARD V. SCHWEITZER.

References Cited in the file of this patent

UNITED STATES PATENTS

| Number | Name | Date |
| --- | --- | --- |
| 397,835 | Cuthbert | Feb. 12, 1889 |
| 904,679 | Burton | Nov. 24, 1908 |
| 1,718,047 | Hunker | June 18, 1929 |
| 2,062,425 | Peters | Dec. 1, 1936 |
| 2,196,094 | Bennett et al. | Apr. 2, 1940 |
| 2,203,572 | Johnson | June 4, 1940 |
| 2,380,509 | Emerson | July 31, 1945 |